A. BUSSE.
METAL FRAME FOR GLASS PANES.
APPLICATION FILED APR. 17, 1909.
942,611.
Patented Dec. 7, 1909.
2 SHEETS—SHEET 1.
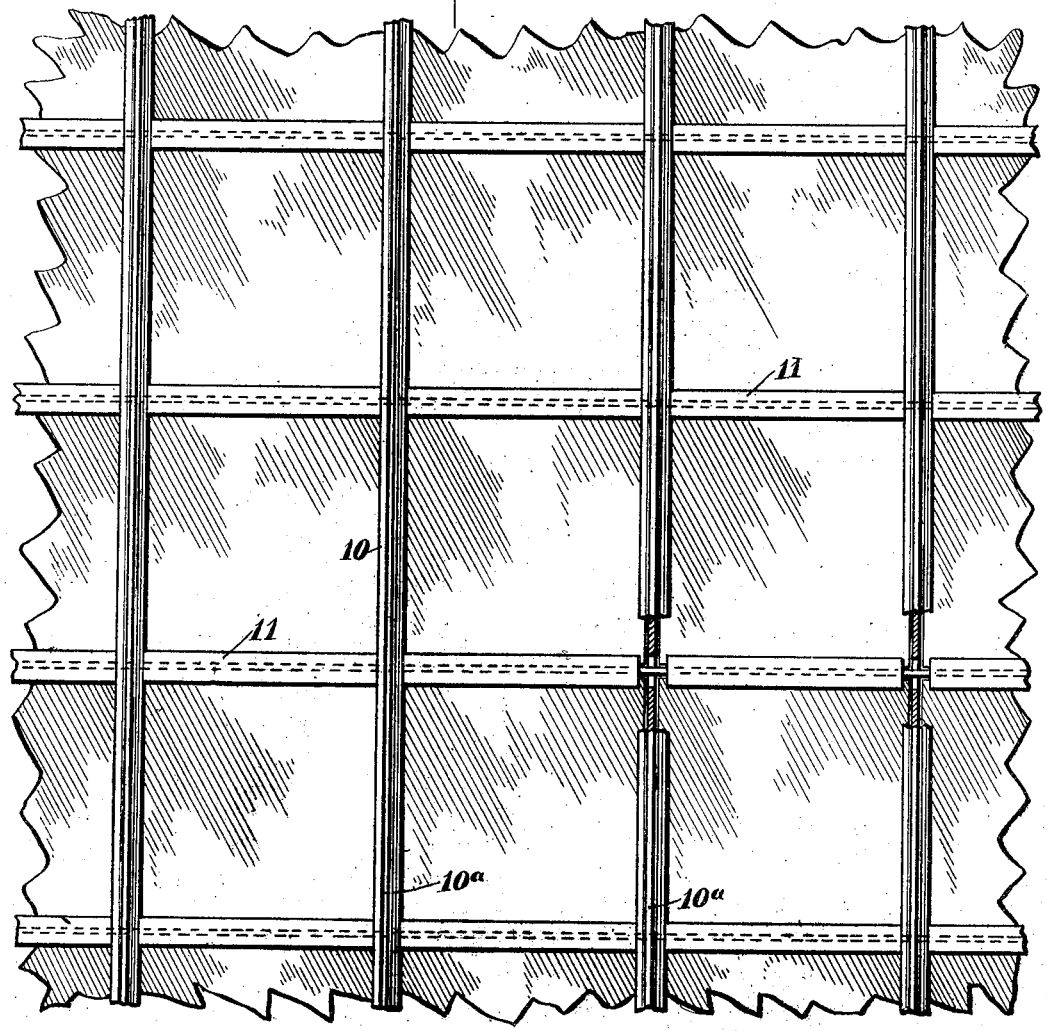
WITNESSES
INVENTOR
Amand Busse.
BY
ATTORNEYS

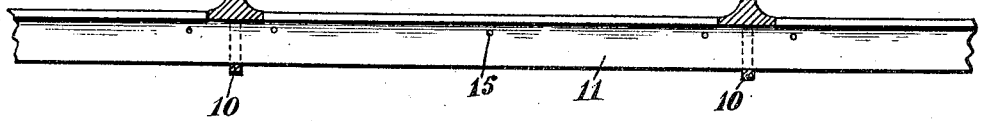
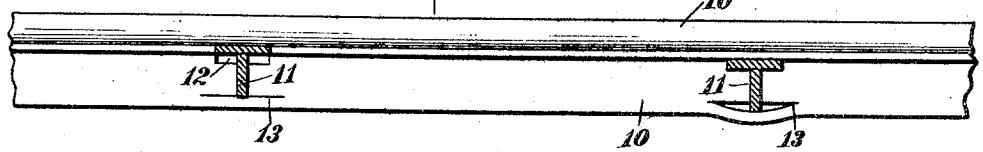
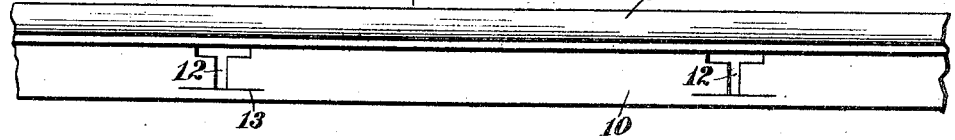
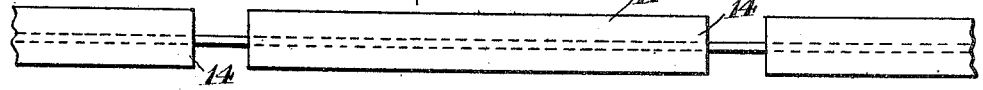
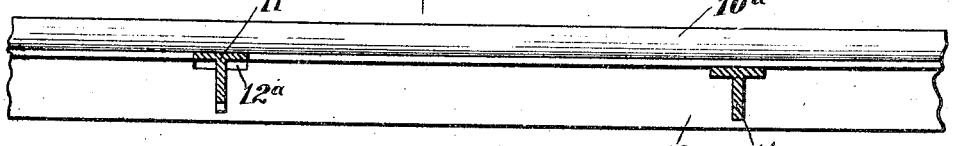

UNITED STATES PATENT OFFICE.

AMAND BUSSE, OF NEW YORK, N. Y.

METAL FRAME FOR GLASS PANES.

942,611.

Specification of Letters Patent. Patented Dec. 7, 1909.

Application filed April 17, 1909. Serial No. 490,556.

*To all whom it may concern:*

Be it known that I, AMAND BUSSE, a citizen of the United States, and a resident of the city of New York, borough of the Bronx, in the county and State of New York, have invented a new and Improved Metal Frame for Glass Panes, of which the following is a full, clear, and exact description.

The invention is an improvement in metal frames for glass panes, such as windows, doors, green-houses, etc., and belongs to that class of such constructions in which the mullions and transoms are formed of intersecting T-bars continuous in length.

The object of the invention is to provide a frame of this character in which no bulging or upsetting of the metal is necessary at the front of the frame, to bring the flanges or heads of the bars into the same plane in order that the glass panes may bear flat against the inner faces of both the mullions and transoms.

Reference is to be had to the accompanying drawings forming a part of this specification, in which similar characters of reference indicate corresponding parts in all the views.

Figure 1 is an outside face view, partly in section, of a frame constructed in accordance with my invention, showing the panes in place; Fig. 2 is a cross-section of the frame; Fig. 3 is a cross-section of the frame on an enlarged scale, taken at the points of intersection of the transoms with the mullions; Fig. 4 is a similar longitudinal section; Fig. 5 is an edge view of one of the mullions; Fig. 6 is an outer face view of one of the transoms; Fig. 7 is a plan of one of the transoms; Fig. 8 is a view similar to Fig. 4, showing a modified form of construction; and Fig. 9 is a fragmentary sectional view of the frame shown in Fig. 8.

The frame as constructed consists of metal mullions 10 and intersecting metal transoms 11, each continuous in length and in the form of a T-bar, with the heads of the mullion bars provided with ribs 10ª centrally arranged on their outer faces to give the frame sufficient strength and rigidity as well as add to the ornamentation of the construction.

In that form of the invention shown in Figs. 1 to 5 inclusive, the webs of the mullions are provided with T-slots 12, through which the transoms pass, the heads of the slots being arranged adjacent to the heads or flanges of the mullions; and slits 13 are formed longitudinally in the webs of the mullions at the ends of the slots. At the points of intersection of the mullions and transoms the heads of the bars of which the latter are formed are transversely cut out as indicated at 14, and best shown in Figs. 6 and 7, the width of the cut-out portions being approximately equal to the width of the heads of the mullion bars.

In assembling the mullions and transoms, the metal at the inner side of the slits 13 is forced or bulged from the web of the mullion bars sufficiently to permit of the transoms being slid through. When the removed or cut-out portions 14 in the heads of the transoms are in place opposite the proper mullions, the bulged portions of the mullion webs are hammered in to their normal positions, which forces the heads of the transoms in a plane with the heads of the mullions, the heads of the latter passing within the cut-out portions 14. The transom and mullion bars have apertures 15 in their respective webs, close to the heads, to receive pins to engage the edges of the glass preparatory to placing in the putty to secure the panes in place.

The construction shown in the left-hand portion of Fig. 8 and that shown in Fig. 9 is in all respects the same as that described, except the slots 12ª in the mullions, corresponding to the slots 12, are of sufficient length to receive the transoms without bulging the webs of the mullions. The transoms in this construction are forced forwardly to bring and secure the heads thereof in a plane with the heads of the mullions, by driving in keys 16, the keys being inserted in the slots back of the inner edges of the transom webs. In either construction the frame presents an unbroken finished appearance at the front and the panes of glass are seated flat against the inner faces of the heads of the bars for their complete width and length.

In the construction shown at the right-hand end of Fig. 8, the head of the transom bar 11 bears against the inner face of the head of the mullion bar 10, in which case the heads of the two sets of bars are not located in the same plane, but one at the rear of the other. With the frame thus constructed a liner of some character should be placed between the glass panes and the inner faces of the outwardly-arranged heads in order to provide a bearing for the edges of the panes along these lines.

Having thus described my invention, I claim as new and desire to secure by Letters Patent:

1. The combination of intersecting mullions and transoms, each in the form of a T-bar, with the bars extending in one direction having T-slots in the webs thereof, through which the intersecting bars pass, and with the head of one of the bars at each point of intersection cut out to receive the head of the other bar and thus locate the heads of all the bars in the same plane.

2. The combination of a series of mullions, and a transom intersecting the mullions, the transom and mullions each being in the form of a T-bar, with the mullion bars having T-slots in the webs thereof, through which the transom passes, and the transom bar having the heads thereof removed to receive the heads of the mullion bars.

3. The combination of intersecting mullions and transoms, each in the form of a metal T-bar continuous in length, one set of said bars having T-slots passing through the webs thereof, with a slit formed in the web at the end of each slot, and the other set of bars received in said slots and having cut-out portions in the heads at the points of intersection to receive the heads of the other bars, and with the bars having the cut-out portions engaged at the inner end and secured in place by the metal at the inner side of the slits.

4. The herein-described process of joining metal T-bar mullions and transoms, which consists in providing the webs of one set of the bars with T-slots of less length than the maximum width of the other bars, and with slits at the inner ends of the slots, expanding the metal at the inner sides of the slots sufficiently to admit of the other set of bars being slid endwise through the slots, providing the other set of bars with cut-out portions adapted to register with the first set of bars and forcing the expanded metal inwardly to secure the two sets of bars together when the cut-out portions of the second set of bars are in register with the first set of bars.

5. The combination of a mullion-bar and a transom-bar intersecting each other, each bar having a head and a web, with one of the bars at the point of intersection having a slot in the web thereof through which the other bar is adapted to be slid when both of the bars are facing in the same direction, and the other bar having its head cut out at the point of intersection to receive the head of the slotted bar and thus locate the heads of both of the bars in the same plane.

In testimony whereof I have signed my name to this specification in the presence of two subscribing witnesses.

AMAND BUSSE.

Witnesses:
W. W. HOLT,
PHILIP D. ROLLHAUS.